UNITED STATES PATENT OFFICE.

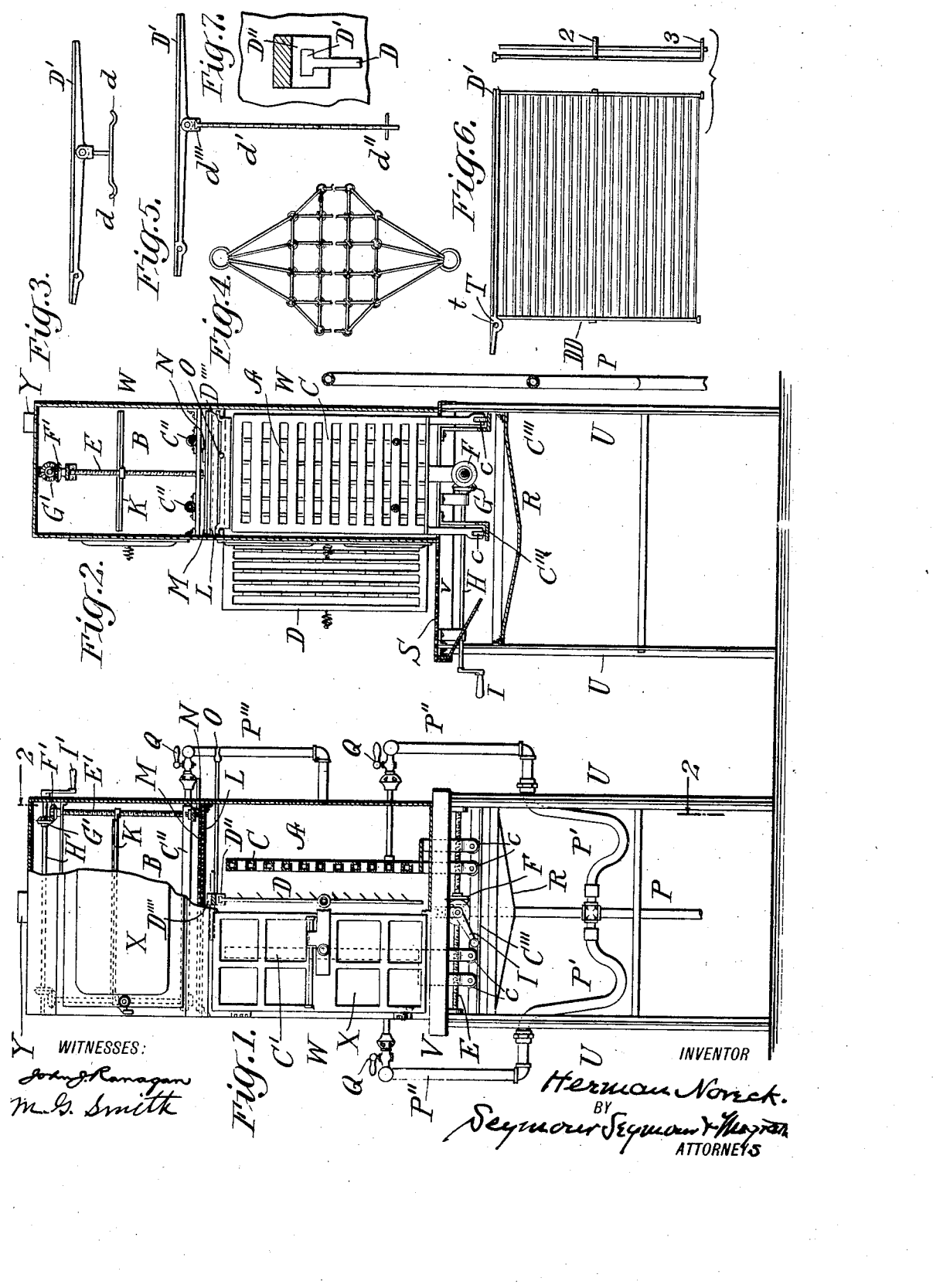

HERRMAN NORECK, OF NORFOLK, VIRGINIA.

BROILER-BAKER.

1,113,473.    Specification of Letters Patent.    Patented Oct. 13, 1914.

Application filed July 3, 1913. Serial No. 777,242.

*To all whom it may concern:*

Be it known that I, HERRMAN NORECK, a citizen of the United States, residing at Norfolk, in the State of Virginia, have invented a certain Broiler-Baker, of which the following is a description.

My invention relates to improvements in broiler-bakers in which gas is employed to produce either uniform or variable heat in regulated intensity, in all applications of heat for cooking all foods in the most appetizing way, in part at one temperature and successively in another or other temperatures, or at a uniform temperature on all sides of the food treated, as required by the best practice, and also for treating with heat simultaneously several kinds of food.

The objects of my improvement are—1st, to provide means for manipulating and regulating the heat, by changing the relative position of the food treated and the burners, without removing or handling the food treated; 2nd, to convey the heat from one application to another without waste; 3rd, to economize fuel and space; 4th, to provide means for inspecting the heat treatment of foods at its various stages; 5th, to save time in the operations; 6th, to provide means for fixing and utilizing all food values in the product; 7th, to provide means for carrying and holding and suspending all kinds of food in positions adjustable to the heat; 8th, to provide means for bringing the heat to bear on both sides of vertically disposed food in uniform or regulated intensity on each side; 9th, to provide movable vertical and adjustable burners; 10th, to provide movable and adjustable grates and food holders; 11th, to provide means for easily introducing and withdrawing the material to be treated; 12th, to provide means for inspecting the treatment.

Other objects will appear from the hereinafter description.

I attain these objects by the mechanism illustrated in the accompanying drawings, in which—

Figure 1 is a front elevation of an improved furnace broiler-baker; Fig. 2 is a side elevation, partly in section, of the same; Fig. 3 is a removable support for food holders; Fig. 4 is a food basket, especially for shell food; Fig. 5 is a fowl holder; Fig. 6 is a side view and also an end view of a holder for fish or toast and the like; Fig. 7 is a detail of the moving support of the grate.

Similar letters refer to similar parts throughout the several views.

The general principle of my improved broiler-baker is carried out by means for employing gas as the fuel by upright burners projecting a multitude of gas flames toward the food, with means for regulating the intensity of the flames, and for regulating the relative distance between the flames and the foods to be treated, without opening the heating chambers, and by convenient manipulations from without.

A is the broiler, being the principal chamber of the whole apparatus.

B is the baker, being a chamber above the broiler, and used concurrently with the broiler, or separately.

C is a burner, operated by gas through pipe connections hereinafter described, and constructed of pipes perforated on the side toward the center of the broiler in a manner to project jets of gas toward the center, which when lighted become jets of flame by which the broiling is accomplished. C' is another similar burner; both burners supported by flanged rollers represented by *c* rolling on a track C'''.

C'' is a burner in the baker, which may be similar to the burner C in the broiler, except that it is stationary, and is arranged horizontally in the bottom of the chamber B and its flame jets project upward.

D is a diagrammatic view of a grate for holding the food to be broiled.

DD of Fig. 6 is a holder for fish, for flat food, or bread for toasting; D in Fig. 2 is a different form of grate, partly withdrawn from the furnace; E is a screw half left-handed and half right-handed, working in corresponding nuts in the burners C and C', carrying a bevel gear F affixed thereto in the middle, with which meshes a bevel gear G on the rod H in suitable bearings not described, rotated by the handle I, the rotation of which causes the burners C and C' to approach and recede from the grate D in the broiler A. A screw E', actuated by a bevel gear F' meshing with a second bevel gear G' on the rod H' rotated by the handle I', serves to raise and lower the shelf K in the baker B to cause the same to approach and recede from the burner C'' in the bottom of the baker.

The bottom L of the baker B is perforated, and the damper M also perforated to register with the perforations of L, but movable thereon by the handle N to close and open the holes in the bottom of the baker B for the admission of heat to the baker B from the broiler A.

The grate D is suspended by an enlarged part D' in the corresponding shape in a block D'' carried on ways D'''' and to this block D'' is attached the rod and handle O by which the block D'' may be moved and carried nearer or farther from the burner C or the burner C', and may be in the equal position between the burners or nearer one or the other.

In Fig. 1 the block D'' is shown as carried by the rod O and upholding the grate D by its enlarged part D', and the whole block D'' carrying the grate D fastened to the rod O, slides in Fig. 1 to the right and left on ways not shown; and in Fig. 2 the rod O is shown in mere cross-section, and slides forward and back carrying the grate D, nearer to the burner C than to C', or vice versa, as may be desired.

P is a gas pipe from a supply of gas not shown, from which flexible or jointed sections P' lead the gas through pipe sections, P'', to the burners C and C', and through other stationary pipes P''' to the burner C'' in the baker B. The pipe P as shown in section in Fig. 2 does not show connected therewith the pipe P''', because it is out of the cross-section. Suitable gas cocks Q control or shut off the gas supply from the several burners.

R is a grease pan for collecting the greases and juices from the food, the contents of which may be withdrawn through a hole not shown in its depression into a bucket not shown. The flat table S is perforated in order that juices and drippings from the food on its withdrawal from the broiler may pass below into the drip-pan R.

In Fig. 3 the head D' like that of the grate D is supported in the block D'', and may replace the grate D in the broiler A for the support on the turning hooks d of various forms of food that may thereby be hung between the burners C and C', or it may support baskets like Fig. 4.

Fig. 4 is a basket composed preferably of linked wire of any convenient form or size for holding shell food, and needs no special description. Fig. 5 comprises a head D' like that in Fig. 3, from which depends a swiveled pointed rod or skewer d', turning in its supporting socket, by a swivel d''', provided with holes in which the pin d'' may be placed underneath the fowl pierced by the rod d'.

The grate DD in Fig. 6 contains a head D' fitting like the implements shown in Figs. 3 and 5, in the corresponding shape carried in the block D'', and is preferably double, spaced apart and held together by perforated pieces 2 and 3 at any convenient distance apart. The grates D and the supports in Figs. 3, 5 and 6 are provided at the outer end with a socket T and pin t in which a stove handle, not shown, may be inserted to handle the parts when hot.

The supports U and the frame V, and the casing W may be of any convenient form, and do not require special description. The panels X of the doors may be of glass, or isinglass, to permit of inspection of the food during the treatment.

Y is a chimney for the escape of the gases.

The operation of my improved broiler-baker is as follows: On the grate D removed from the broiler A, I impale, for example, a steak, or a number of steaks, and return the grate and its load to the broiler by inserting the head D' of the grate in the block D'', and adjust the same by the handle O at a point between the burners C and C' in a position such that the food to be treated, irrespective of the grate itself, will be midway between the burners C and C'. The gas supplied by the cocks Q having been turned on, I light the same at the burners, and by turning the handle I the burners C and C' are brought near to the steaks to quickly sear over the outside on all sides, and I may then by rotating the crank I in the opposite direction gradually withdraw the burners from both sides of the steak to complete the treatment more slowly. At the same time the damper N being open, I insert forms of dough for making loaves of bread on the shelf K in the baker B, and may at the same time light the burner C'' for more intense heat and quicker baking; and by the handle I' may raise or lower the shelf K as desired for the best results. In a similar manner I may charge the basket in Fig. 4 with shell food or the grate of Fig. 6 with fish, or the rod of Fig. 5 with fowls, and by inserting any one of these supports in the baker A in place of the grate D, readjusting the block D'' by the handle O, and by manipulating the burners C and C'' by the handle I, I bring uniform and regulated heat to bear on all sides in any desired intensity, and by other manipulations of the handle O, I may bring more heat to bear on one side than on the other, and so proceed from stage to stage of the treatment with any desired application of heat, in any desired intensity, on any part of the food, by outside control of the relative distance between the heat and the food, whereas in horizontal broilers the heat from below is greater than the heat from above and impossible to regulate and the drippings from the food are in part consumed by the flames applied from underneath. I have discovered that many foods thus cooked are more savory and may be cooked in much less time than in any other apparatus, and that where the interior cooking must be continued after the outside is sufficiently cooked I may achieve this result by my perfect regulation of heat in a more perfect manner than ever before.

Many variations can be made in all parts of the apparatus without departing from the spirit of my invention, and the description which I have given of the apparatus is that of its preferable form, and is made by way of illustration only and not as a limitation.

Having described my invention, what I claim as new and desire to secure by Letters Patent is—

1. In a broiler-baker, movable upright burners in pairs adapted to project naked gas flames toward the food without intervening radiating plates, means for supporting food between the burners, adapted to expose the food to the direct action of the naked gas flames, and means for moving the burners toward or away from the food.

2. In a broiler-baker, movable upright burners in pairs adapted to project naked gas flames toward the food, means for supporting food between the burners, means for moving the burners toward or away from the food simultaneously, and means for moving the food support either toward or from either burner.

3. In a cooking apparatus, the combination of a pair of burners, a food support between the burners and means for moving the burners toward or away from the food support and for moving the food support toward or away from either of said burners.

4. In a cooking apparatus, upright movable gas burners in pairs adapted to project naked gas flames toward the food, a double grate for holding the food intended to be cooked, whose members may be spaced and locked apart at variable distances, and adjustable as a whole by the rod O and its accessories toward or from either burner, and slideways adapted to support the holder between the upright movable burners.

5. In a cooking apparatus, upright movable gas burners in pairs projecting naked gas flames toward the food intended to be broiled therein, an adjacent baker, means for passing the heat from the broiler to the baker, means for producing gas jets within the baker, means for changing the relative distance between the food to be baked and the burner.

In testimony whereof I have hereunto set my hand, at the borough of Manhattan, city and State of New York, this 2nd day of July, 1913.

HERRMAN NORECK.

In presence of—
M. GRAY SMITH,
JOHN J. RANAGAN.